April 15, 1930.   S. KOHN   1,754,897
AUTOMATIC SOUND REPRODUCING MACHINE
Filed Oct. 10, 1921   8 Sheets-Sheet 5
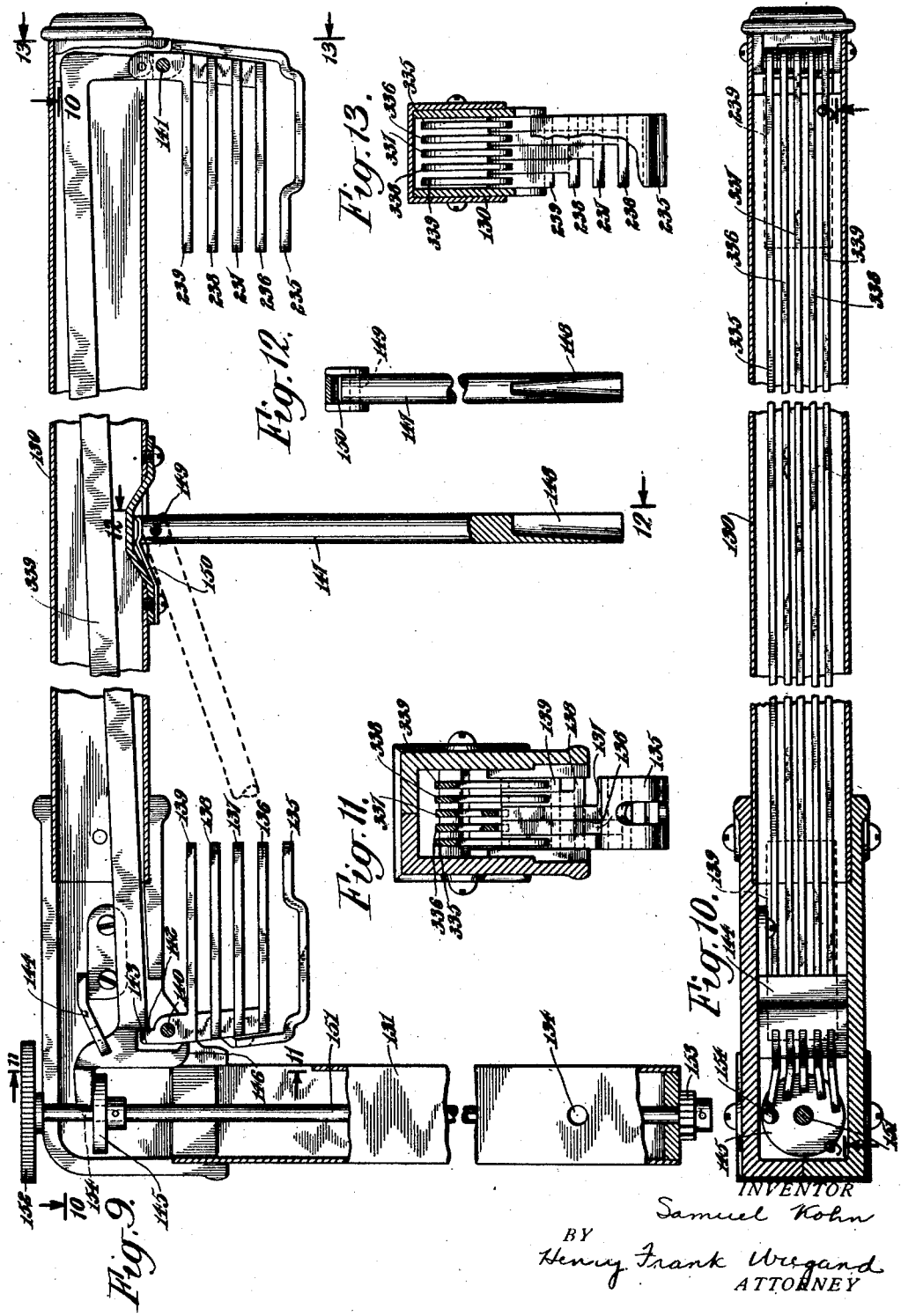

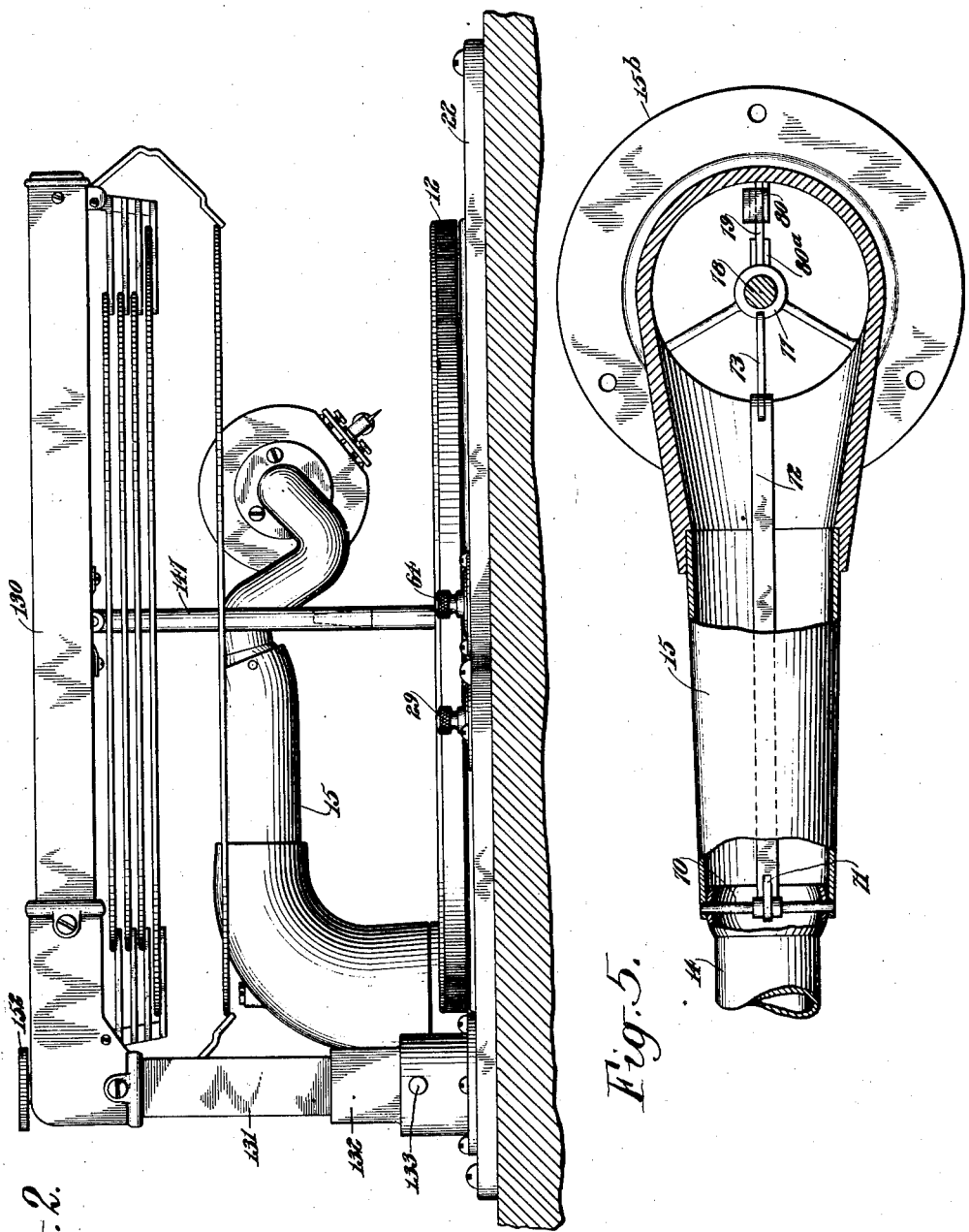

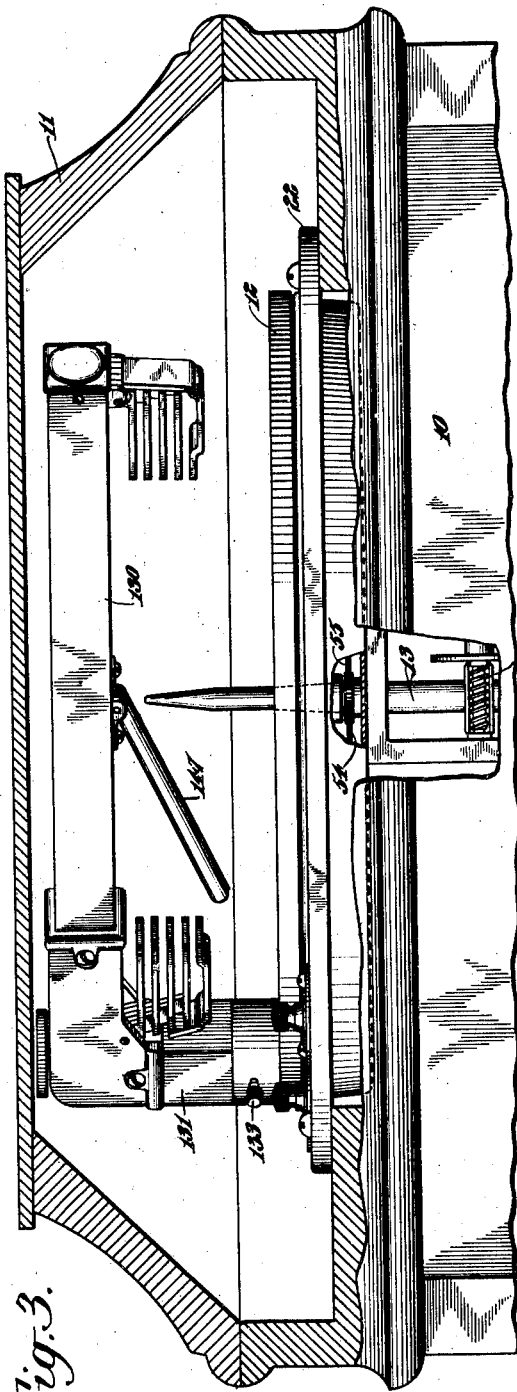

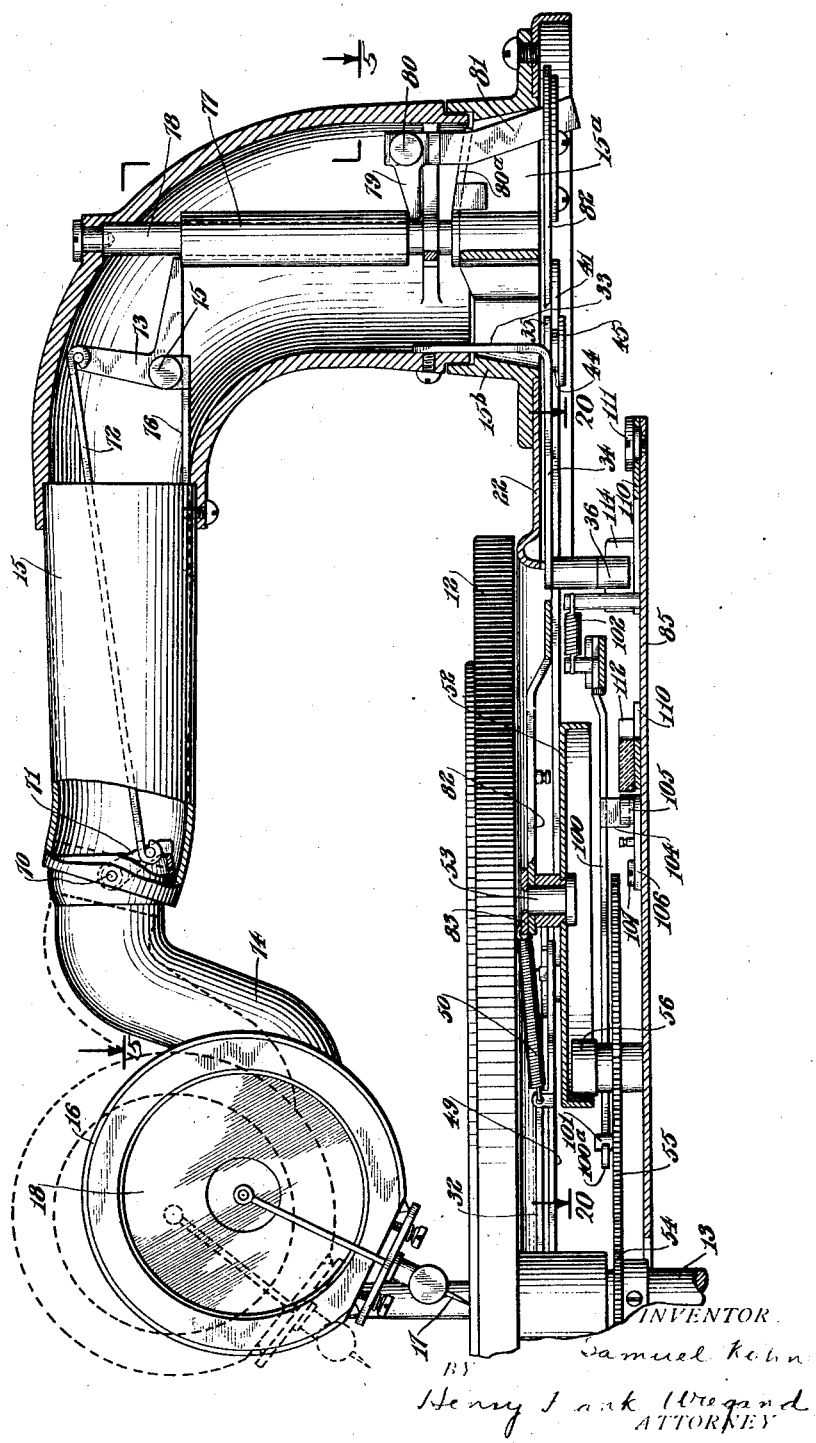

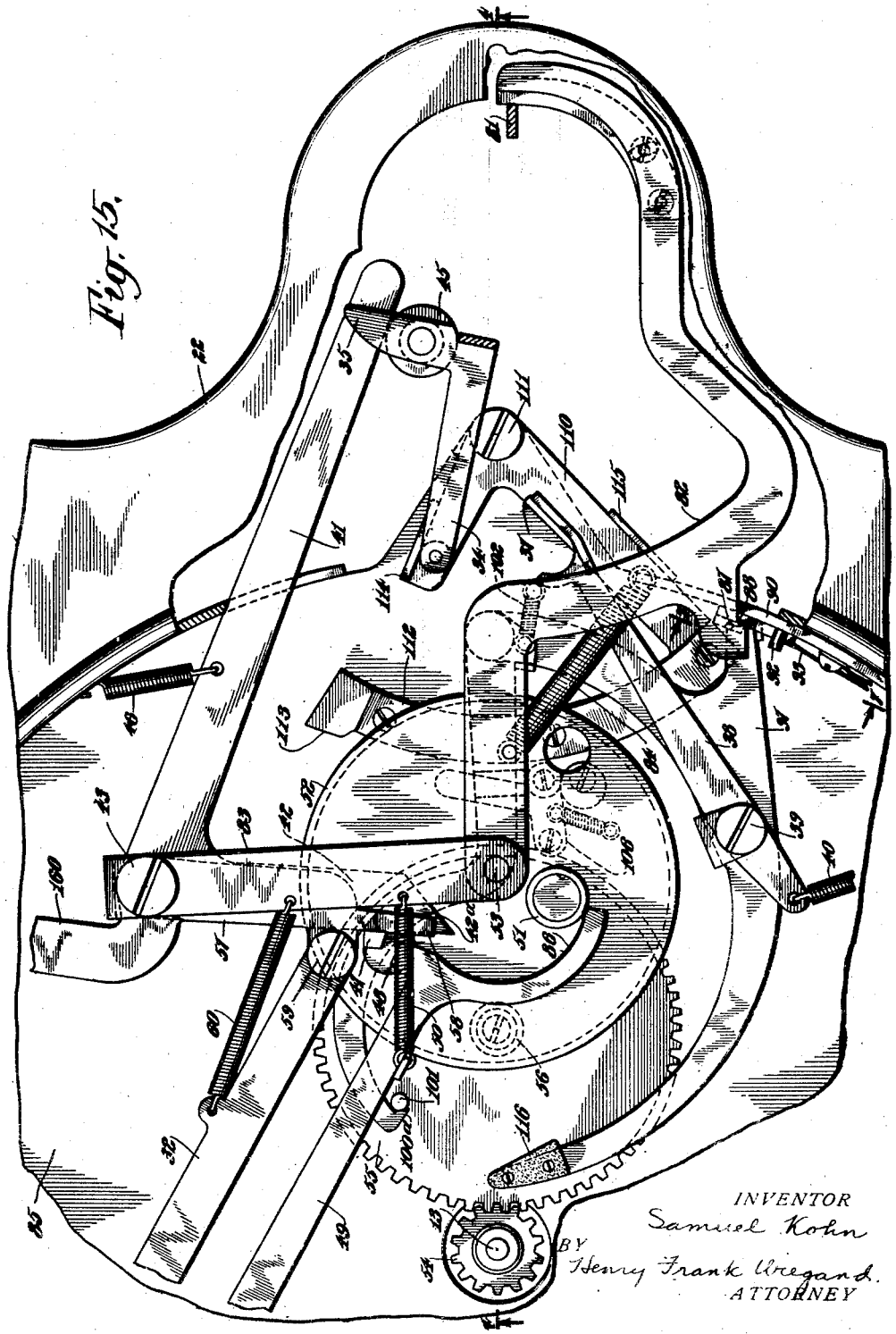

April 15, 1930. S. KOHN 1,754,897
AUTOMATIC SOUND REPRODUCING MACHINE
Filed Oct. 10, 1921 8 Sheets-Sheet 8
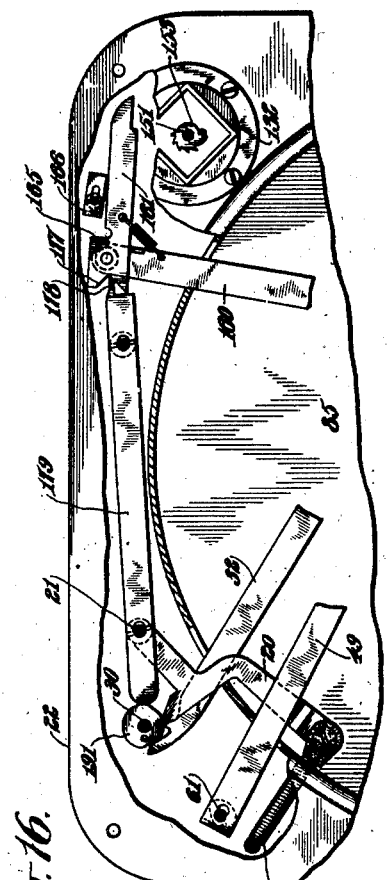
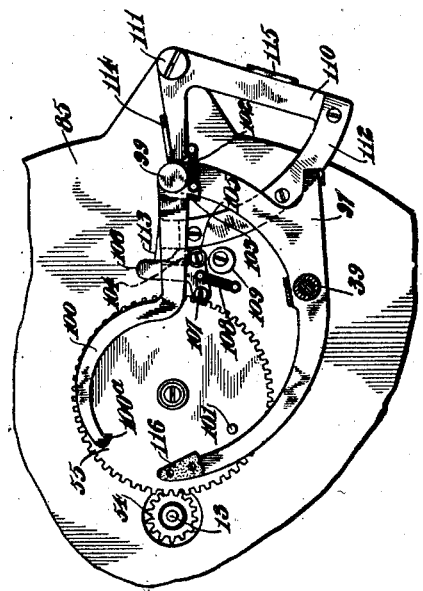
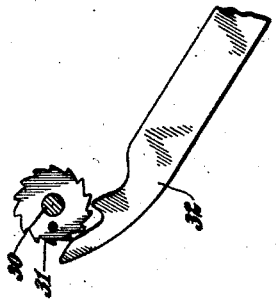
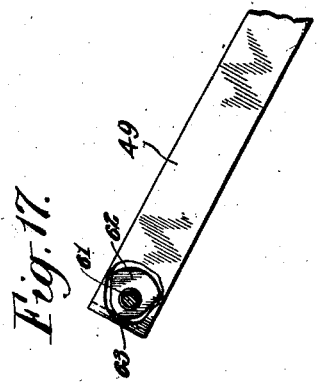
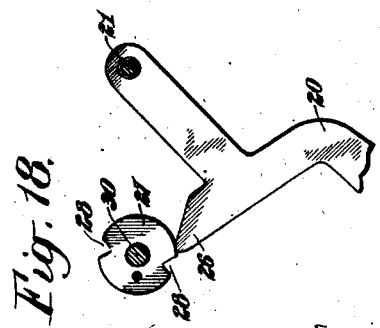
INVENTOR
Samuel Kohn
BY
Henry Frank Wiegand
ATTORNEY Patented Apr. 15, 1930

1,754,897

UNITED STATES PATENT OFFICE

SAMUEL KOHN, OF NEW YORK, N. Y., ASSIGNOR TO WONDA PHONOGRAPH CO., INC., OF NEW YORK, N. Y., A CORPORATION OF NEW YORK

AUTOMATIC SOUND-REPRODUCING MACHINE

Application filed October 10, 1921. Serial No. 506,739.

This invention relates to machines for reproducing sound and has for one of its objects to provide a machine for automatically playing a series of records.

Another object of the invention is to provide a sound-reproducing machine adapted automatically to repeat the playing of a record.

A further object is to provide a machine in which the sound box and tone arm are automatically restored to initial, non-playing, or inoperative position after a record has been played.

A further object is to provide machines operating as outlined above and adapted to perform their functions even though sound records of different sizes are to be played.

A further object is to provide apparatus which may be readily attached to standard sound-reproducing machines now in use, with few changes in the latter, to form a combination having each or all of the above desiderata. Further objects and advantages will appear as the invention is hereinafter disclosed.

Referring to the drawings which illustrate what I now consider a preferred form of the invention:

Fig. 2 is a sectional elevation taken substantially on the line 2—2 of Fig. 1.

Fig. 3 is an elevation of the machine, partly in section, on a plane substantially through the line 3—3 of Fig. 1.

Fig. 4 is a sectional elevation taken substantially on the line 4—4 of Fig. 15.

Fig. 5 is a detail sectional plan view taken substantially on the line 5—5 of Fig. 4.

Fig. 6 is a detail sectional elevation taken substantially on the line 6—6 of Fig. 14.

Fig. 7 is a detail sectional elevation taken substantially on the line 7—7 of Fig. 15.

Fig. 8 is a detail sectional elevation taken substantially on the line 8—8 of Fig. 1.

Fig. 9 is a detail elevation, partly in section, of a record-supporting rack employed in the machine.

Fig. 10 is a sectional plan view taken substantially on the line 10—10 of Fig. 9.

Fig. 11 is a detail sectional elevation taken on the line 11—11 of Fig. 9.

Figs. 12 and 13 are detail sectional elevations taken on the lines 12—12 and 13—13 respectively, of Fig. 9.

Figure 14:
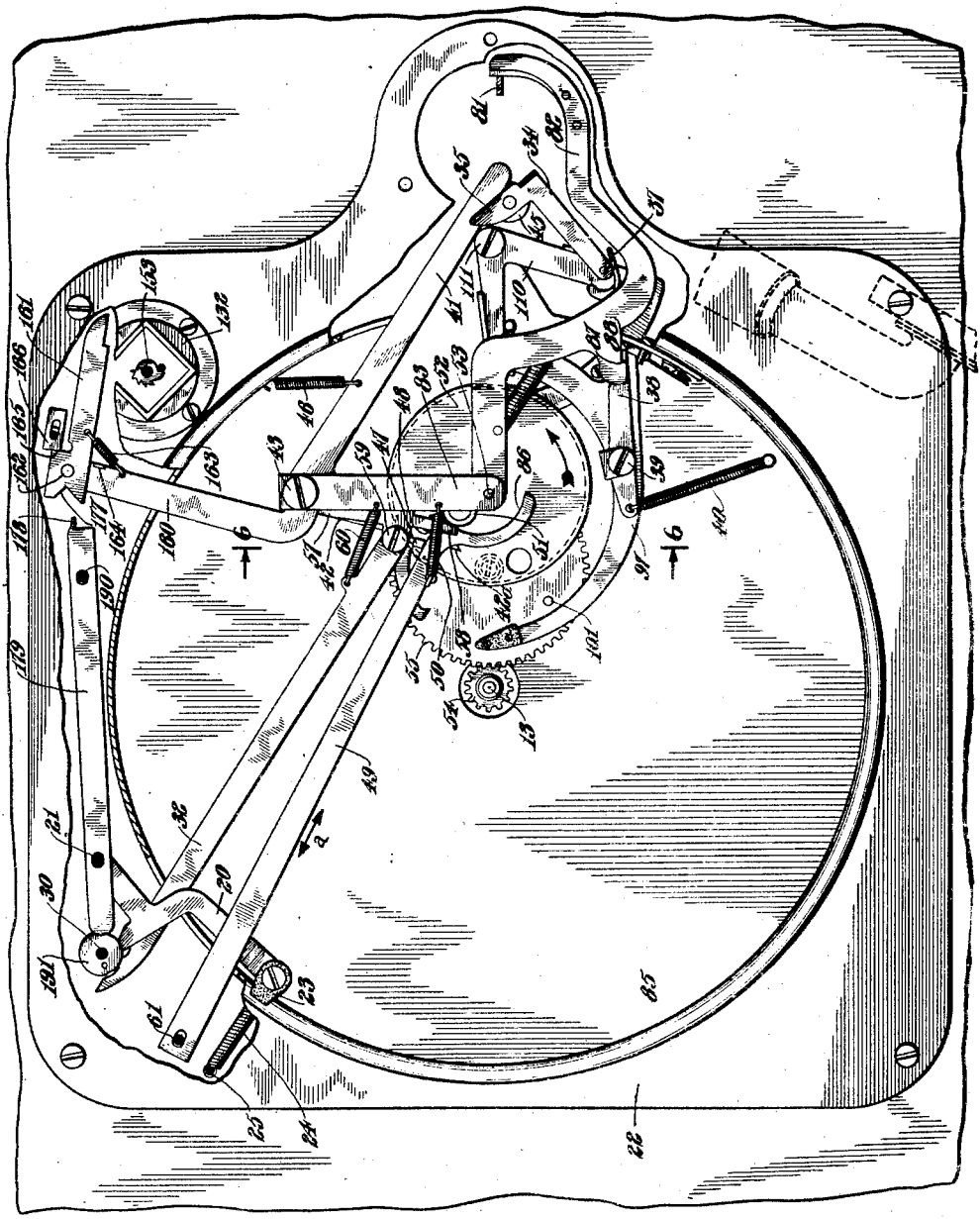

Fig. 14 is a plan view of the machine, certain parts being removed and others cut away to facilitate illustration.

Fig. 15 is a view generally similar to Fig. 14 but illustrating the parts in different positions.

Fig. 16 is a fragmentary plan view, partly broken away to illustrate certain of the operating parts.

Figs. 17, 18 and 19 are detail horizontal sections taken on the lines 17—17, 18—18, and 19—19, respectively, of Fig. 8.

Fig. 20 is a detail horizontal section taken substantially on the line 20—20 of Fig. 4.

Referring to the drawings it will be seen that I have shown my invention applied to a form of sound-reproducing machine now well known in the art as a phonograph. This machine comprises a cabinet 10 provided with a hinged cover 11, and a turn-table 12 adapted to be rotated by a suitable spring- or other motor (not shown) which propels a spindle 13 through gearing 14, the turn-table being operatively connected to the spindle 13 to be rotated thereby. A tone arm 15, mounted to swing in a horizontal plane in the usual manner, is provided with a sound box 16 adapted to move from the dotted line to the full line position, and vice versa, as shown in Fig. 4. The sound box is provided with the usual replaceable needle 17 adapted to engage the spiral groove or track of a record, to be set in vibration by the undulations in such groove, and to transmit such vibrations to a diaphragm 18, the resultant sound vibrations being transmitted through the hollow tone arm to a suitable amplifier. Before proceeding further with the disclosure of my invention I wish to emphasize that, while it is illustrated applied to and in combination with a sound-reproducing machine adapted to play lateral cut disc records, it may be embodied in other types of machines adapted to play other types of records.

From one aspect my invention comprises mechanism which, when a record has been placed upon the turn-table and the mechanism started, automatically performs the following results. The tone arm moves from non-playing position to playing position, the sound box then moves so as to engage the needle with the groove of the record, the record is then played, the sound box raises, the tone arm moves to initial or inoperative position, and the apparatus stops. One form of mechanism for accomplishing these results is illustrated in the drawings and may be constructed as follows.

The motor (not shown) tends at all times to rotate the spindle 13 and turn-table 12 but at certain times stopping mechanism is called into action to stop the operation of these parts. This stopping mechanism is shown in the form of a brake arm 20, pivoted at 21 to the base plate 22, provided with a brake shoe 23, of suitable material, adapted to engage the rim of the turn-table 12, and biased toward the last named position by means of a spring 24, secured at one end to said lever 20 and at its other end to a pin 25 carried by the plate 22. The arm 20 is provided with a projecting portion 26 (see Fig. 18) adapted to cooperate with a cam 27 provided with notches 28, the design being such that when the member 26 enters either of the notches the brake will be applied but when the member 26 engages any other portion of the periphery of the cam the brake shoe will be held away from the turn-table rim. Means are provided for manually controlling the position of the last mentioned cam and consequently the starting and stopping of the train of mechanism. This means is shown in the form of a manually operable head 29 secured to the same shaft 30 to which the cam 27 is secured, said shaft 30 being journaled in the base plate 22. (See Fig. 8.) Means are also provided for automatically operating the cam 27 to stop the train of mechanism. The last mentioned means comprises a ratchet wheel 31, secured to the same shaft 30 to which the cam 27 is secured, and a pawl or pawl arm 32 for operating the same in a clockwise direction. (See Figs. 8 and 19.) The mechanism which operates the pawl arm 32 will be hereinafter described. I shall now proceed to describe the means for moving the tone arm 15 from non-playing position to playing position.

The tone arm 15 is pivoted for rotation about the vertical rod 78 in the usual manner. It has secured thereto an arm 33 (see Fig. 4) which terminates in two horizontally disposed arms 34 and 35. The arm 34 carries a depending pin or roller 36 adapted to be engaged by the end 37 of a lever 38, oscillatable about a stationary pivot 39. A spring 40 connected to the lever 38 biases the latter in such direction as to cause the arm 34 and tone arm to move clockwise when the parts are free so to move. For controlling the last mentioned movement and also for moving the tone arm 15 in the opposite, or counter-clockwise, direction, the following means may be employed.

A bell crank lever comprising the arms 41 and 42 is oscillatable about a fixed pivot 43. The arm 41 is adapted to engage a pin or roller 44 (see Fig. 4), the end of the arm 35 and a head 45 being adapted to be respectively above and below the end of the lever 41 to guide the latter. A spring 46 secured to the arm 41 biases the latter in a counterclockwise direction. Obviously when the arm 41 is free to move under the action of the spring 46 the spring 40 and connected elements 38, 34 will move the tone arm 15 in a clockwise direction and when the arm 41 is held stationary the clockwise movement of the tone arm is stopped or limited. At a certain stage in the operation of the machine the arm 41 is limited in its counterclockwise movement by the engagement of a turned up lug 47, provided on the arm 42, with a shoulder 48 provided on an arm 49 hereinafter more specifically described. Suffice it to say at this point that the movement of said arm 49, in the direction of the arrow $a$ in Fig. 14 and under the action of the tension spring 50, is limited in accordance with the size of record adapted to be played at the particular time. It will be understood that the last described limitation of movement of the arm 41 limits the clockwise movement of the tone arm to the playing positions under the action of the spring 40.

In order to move the bell crank 41—42 in a clockwise direction and thereby the tone arm 15 in a counterclockwise direction, the outer end of the arm 42 is sloped as indicated at 42$^a$ to be engaged and operated by a roller 51 carried by a disc 52, journaled for rotation at 53. The disc 52 is adapted to be rotated by the spindle 13 (see Fig. 4) through a train of gearing including a pinion 54 secured to said spindle and meshing with a spur gear 55, and a friction roller or pinion 56 which is secured to a shaft to which the gear 55 is secured and which is adapted to engage the inner face of the peripheral flange of the disc 52, to rotate the latter.

The roller 51 is also preferably employed as a part of the means for operating the brake-controlling pawl arm 32 above referred to. An arm 57, pivotally mounted on the stationary pivot 43, is pivotally connected at 59 to the pawl arm 32. A finger 58 is provided on the arm 57 and is adapted to be engaged and operated by the roller 51 during a predetermined part of the revolution of the latter. The arm 57 is biased to move in the opposite direction and the pawl arm is biased toward its ratchet 31 by means of a tension spring 60 secured at one end to said arm 32 and at its other end to an arm hereinafter more specifically referred to.

Figure 1:
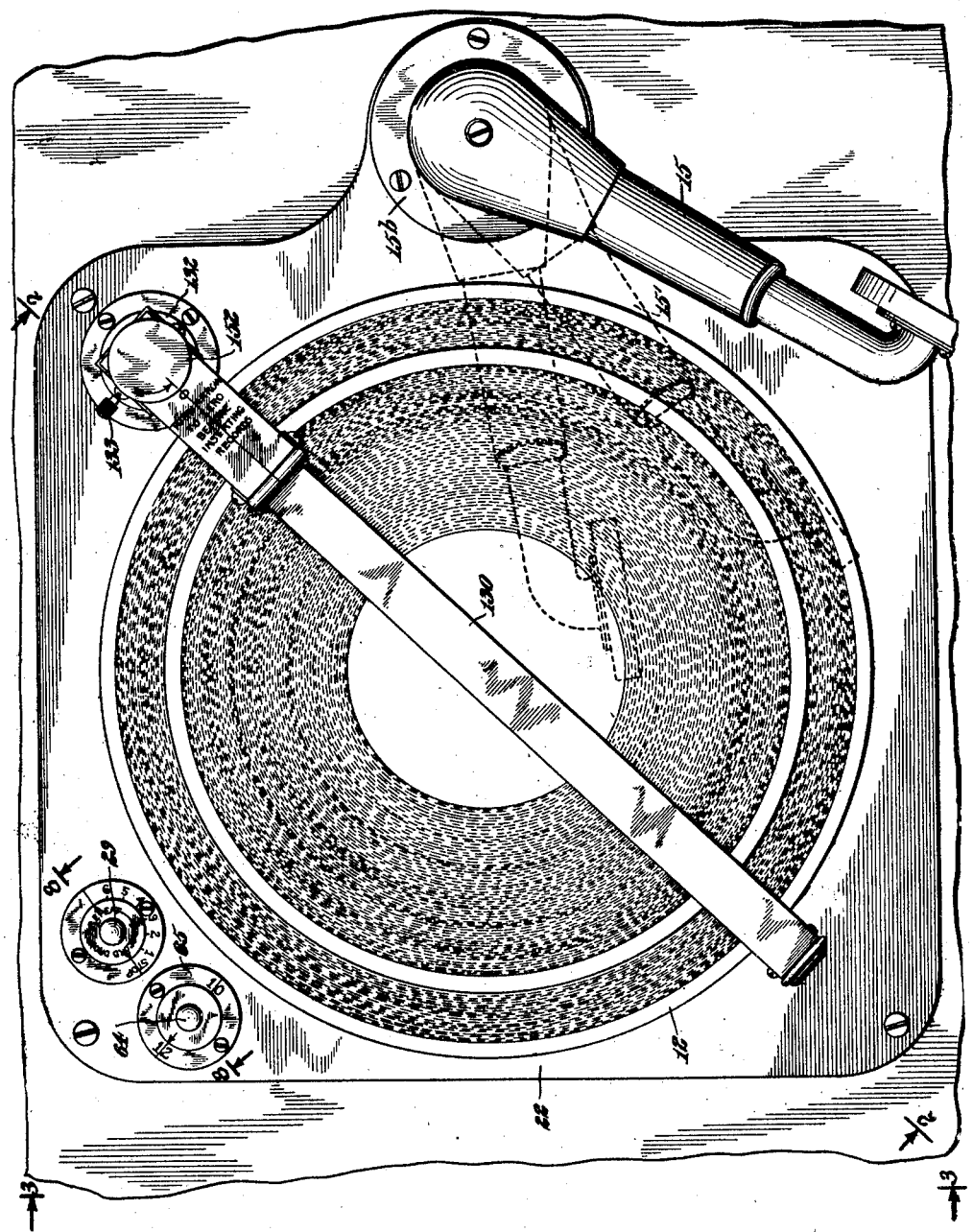
Fig. 1 is a fragmentary plan view of one form of sound-reproducing machine embodying my invention.

As previously stated the arm 49 controls the extent of movement of the tone arm 15 from its full-line position shown in Fig. 1, i. e., the initial or non-playing position, to playing position. While the machine may be adapted to play various other sizes of records I have illustrated one adapted to play either of two sizes, say ten inch or twelve inch records. To effect this result the arm 49 is loosely mounted on a pivot 61 for movement in a longitudinal direction as well as for oscillation. The pivot 61 is journaled in the plate 22 (see Fig. 8) and has secured thereto at its upper end a knob or manually settable member 64 and, at its lower end, a cam 62 (see also Fig. 17) against the periphery of which the flanged end 63 of the arm 49 is held by the spring 50. When the cam 62 is in the position shown in Fig. 17 the setting is for smaller or ten inch records, and when the cam is 180° from the first named position the setting is for the larger or twelve inch records. If desirable the knob may be provided with an index to cooperate with a dial 65 (see Fig. 1) to aid the operator in effecting the desired setting. I shall now proceed to describe a form of means for raising and lowering the sound box 16.

Calling attention to Figs. 4 and 5 it will be seen that the sound box is mounted for movement, with respect to the tone arm, about a substantially horizontal pivot 70. A lever 71 mounted on the pivot 70 engages the lower edge of the end of the tube section 74 and is connected by a link 72 to one arm of a bell crank lever 73. The latter is shown pivotally mounted at 75 on a bracket 76, carried by the tone arm, and the other of its two arms rests upon the upper end of a sleeve 77 slidably mounted upon the rod 78 about whose axis the tone arm oscillates. The lower end of the sleeve 77 engages an arm 79 of a bell crank lever pivotally mounted at 80 on a bracket 80ª which is mounted, as shown, on a rib 15ª of the lower stationary portion 15ᵇ of the tone arm 15, and whose other arm 81 is engaged by an arm 82 hereinafter more specifically described. When the arm 82 moves to the left (Fig. 4) the bell crank 81 is moved clockwise to raise the sleeve 77 which in turn, through the elements 73, 72, 71, raises the sound box from the playing position to the raised or non-playing position, these two positions being respectively illustrated in full lines and dotted lines in Fig. 4. When the arm 82 is moved in the opposite direction, to a sufficient extent, the sound box is permitted to drop by gravity to record-engaging position.

Besides operating the various members outlined above as being operated by the disc 52, the latter is adapted also to operate the arm 82. To effect these various results, and others hereinafter set forth, I mount the shaft 53, which rotatably supports the disc, upon an arm 83 mounted to oscillate on the stationary pivot 43. While the disc is circular, it is mounted eccentrically on the shaft 53 so that in its rotation by the wheel 56, the shaft 53 will oscillate about the pivot 43. This oscillatory motion is employed to operate the arm 82, the latter being pivoted to the shaft 53. A spring 84, secured at one end to the arm 82 and at its other end to the plate 90 serves not only to bias the arm 82 but to bias the disc 52 into engagement with the friction roller 56. Bearing in mind that the disc 52 is rotated in a counterclockwise direction by the motor (not shown), it may be stated that the design and relative location of parts is such that when the roller is in substantially the position shown in Fig. 14 the shaft 53 is in its extreme left hand position of travel and when the roller 51 is in the position shown in Fig. 15, the said shaft 53 has not quite reached its extreme right hand position. It will be noted also that the roller 51 engages and operates a cam portion 86, provided on the arm 49, in such manner that when the roller moves from the position shown in Fig. 14 to that shown in Fig. 15, the shoulder 48 is moved from a position in the path of the lug 47 to a position out of such path.

Means are provided for stopping the disc 52 in the position shown in Fig. 15, though the turn-table and spindle 13 are rotating at this time. This means is illustrated as comprising a shoulder 87 adapted to engage the upper arm 88 of a three-arm lever pivoted at 89 on a plate 90 carried by the side wall of the pan 85. The three-arm lever is biased to the position shown in Fig. 7, i. e., to a position in which the arm 88 is in position to be engaged by the shoulder 87 and in which the arm 91 engages the limit stop pin 92. by means of a spring 93. When the shoulder 87 engages the arm 88 further movement of the shaft 53 to the right is prevented so that continued rotation of the disc 52 will cause the latter to be disengaged from its driving roller 56, as shown in Fig. 15. The roller 51 occupies the position shown in Fig. 15 and the disc 52 remains stationary, so long as the record upon the turn-table is being played. Means are provided for automatically starting the disc 52 after the record is played and the needle 17 is in the last groove of the record. One form of such means is illustrated in the drawings, particular attention being called to Figs. 4, 7, 14, 15 and 20, and may be constructed substantially as follows.

The arm 95 of the three-arm lever clearly shown in Fig. 7 is adapted to be engaged and operated by a lug 96, provided on a lever 97, to move the arm 88 out of the path of the shoulder 87 on the arm 82. When the shoulder 87 is so freed the spring 84 moves the flange of the disc 52 into engagement with the friction wheel 56 so that the disc will be rotated. The lever 97 is mounted for oscillation about a stationary pivot 39 and has pivotally secured thereto at 99 a pawl 100 adapted to be engaged and operated by a pin 101 on the gear 55 when the hook end of said pawl 100 is biased in a counterclockwise direction with respect to the lever 97 by means of a spring 102 secured thereto and anchored, at its other end, and limited in such relative movement by the engagement of a lug 103, on said pawl 100, with said lever 97. The spring 102 serves also to bias the lever 97 in a clockwise direction. The pawl 100 is provided with a depending lug 104 adapted to be engaged by a roller 105 carried by one arm of a T shaped lever 106 pivotally mounted at 107 on the pan 85, the said lever 106 being movable from a position in which the pawl 100 is held out of the path of movement of the pin 101, to a position in which it is in such path of movement, and vice versa. A spring 108, secured at one end to the pan 85 and at its other end to the T shaped lever 106 biases the latter in a clockwise direction, such movement being limited by the engagement of the roller 105 with a stop 109 secured to the pan 85. A segment 110 is pivotally mounted at 111 on the pan 85 and is shown provided with a friction pad 112 adapted to engage the toe 104 to hold the pawl 100 out of the path of the pin 101 so long as the segment 110 is moving in a clockwise direction from its position shown in Figs. 14 and 20. The segment 110 is provided also with a laterally extending part 113 adapted to engage the long leg of the T shaped lever 106 to hold the pawl 100 out of the path of the pin 101 when the segment is in the position shown in Figs. 14 and 20. In other words, in this relative position of parts the part 113 (see Fig. 20) holds the lever 106 in such position that the roller 105 pressing against the lug 104 prevents the spring 102 from pulling the hooked end 101$^a$ of the pawl 100 into the path of movement of the pin 101. The segment lever 110 is provided with two vertically extending members 114, 115 adapted to be engaged by the tone arm-operated roller 36 in the opposite movements of the tone arm 15. Fig. 15 shows the position of the segment 110 when the tone arm is in its last groove position and Fig. 20 shows the position of the segment 110 in its extreme opposite position of movement by the tone arm.

The lever 97 is adapted to be engaged, at its end opposite the pivotal connection 99, by the pin 101. Preferably the said end of the lever 97 is provided with a noise-reducing buffer 116, of suitable material, adapted to be engaged by the said pin 101. The throw of the lever 97 due to the engagement of the pin 101 with the buffer 116 is in itself insufficient to remove the arm 88 from the path of movement of the shoulder 87, nor does such movement of the lever 97 have any operative effect in permitting the toe 100$^a$ of pawl 100 to move into the path of the pin 101, so long as the segment 110 is moving clockwise with the tone arm 15. As the tone arm moves across the record the part 113 moves beyond the lever 106 and the pawl 100 turns about its pivot 99, by virtue of the pull of the spring 102, until the lug 104 strikes against the friction pad 112. This engagement of the lug 104 with the moving friction pad 112 causes the pawl 100 to be turned in a clockwise direction about its pivot 99. When the pin 101 strikes the buffer 116 and moves the lever 97, the lug 104 is disengaged from the friction pad and the pawl 100 is pulled back (or counterclockwise) by the spring 102 to a position in which the hook 100$^a$ is in the path of movement of the pin 101. However, as the lug 104 is now again in engagement with the friction pad, which is still moving clockwise with the tone arm, the hook 100$^a$ is moved out of the path of movement of the pin 101 before the latter reaches its position where it would engage the toe or hook 100$^a$ if the said toe or hook 100$^a$ were in its inner position. In other words, in the interval between the time the pin 101 disengages the buffer 116 and travels around to the toe or hook 100$^a$ the latter will have been moved, by re-engagement of the lug 104 with the moving friction pad, out of the path of movement of the pin 101. When the needle reaches the last groove of the record, lateral movement of the tone arm and the friction pad cease. Now when the pin 110 strikes the buffer 116 and moves the lever 97 to disengage the lug 104 from the friction pad, the hook or toe 101$^a$ is not moved out of the path of movement of the pin 101 but is engaged and operated by the latter. The lever 97 is then moved sufficiently in a counterclockwise direction to move the arm 88 out of the path of the shoulder 87. The spring 84 then moves the flange of the disc 52 into operative engagement with the drive roller 56. The operation of the machine as thus far described is substantially as follows. Assume that the parts are in the position shown in Fig. 14 and it is desired to play a large (or 12 inch) record. The latter is placed upon the turn-table and the knob 64 adjusted for a twelve inch record. The knob 29 is then so adjusted that one of the notches 28 is spaced one step in a counterclockwise direction from the finger 26 of the brake lever 20, i. e., in such position that the repeat arrow on disc 29 is set at number one. The spindle 13, turn-table 12 and disc 52 then start to rotate. When the roller 51 has passed the end of the arm 42, the spring 46 moves the bell crank 41—42 until the lug 47 engages the shoulder 48. The spring 40 then acts through the elements 38, 34 and 33 to move the tone arm 15 clockwise until the pin or roller 44 carried by the arm 35 engages the arm 41. The tone arm is then in the position indicated in dotted lines at 15′ in Fig. 1, i. e., in such position that the needle 17 is directly above a path slightly outside of the first record groove. Continued revolution of the roller 51 now accomplishes two results. The arm 82 is moved toward the right sufficiently to permit the sound box 16 to drop into playing position and the roller 51, by engaging the cam portion 86 of the arm 49, moves the shoulder 48 out of the path of the lug 47. The spring 40 now moves the tone arm clockwise so that the needle 17 enters the first groove of the record and the playing now starts in the usual manner. When the roller 51 has reached the position shown in Fig. 15, the shoulder 87, of the arm 82, engages the arm 88 and the rotation of the disc 52 ceases. When the tone arm 15 has moved far enough to cause the roller 36, of the arm 34, to engage the vertically extending member 114 of the segment lever 110 the latter begins to move clockwise. The extended portion 113 of the segment is then moved away from the T shaped lever 106, but the pawl 100 is not permitted to engage the pin 101 at this time for reasons hereinbefore explained. When the needle 17 has reached the last or inside groove on the record, the movement of the tone arm and segment 112 ceases. The action of the elements 101, 116, 102, etc. as above explained, permits the toe 100ª to move into the path of the pin 101. (See Fig. 15.) The latter then moves the pawl 100 and lever 97 in a counterclockwise direction about the pivot 39 and the lug 96 on the lever 97 moves the arm 95 (see Fig. 7) to a sufficient extent to move the arm 88 out of the path of movement of the shoulder 87 on the arm 82. The spring 84 then moves the disc 52 so that the flange of the latter again engages the friction drive roller 56, and the disc 52 again rotates. The shaft of the disc first moves to the right slightly and then moves to the left, moving the arm 82 to the left to raise the sound box 16 to the non-playing position as shown in dotted lines in Fig. 4. Subsequently the roller 51 engages the sloping end of the bell crank lever 41—42 to rotate the latter clockwise about its pivot 43 to move the tone arm 15 in a counterclockwise direction. During this last described movement, the roller 36 of the arm 34 engages the end of the lever 38 and the upturned portion 115 of the segment lever 110 to restore these parts and the tone arm to initial position. Subsequently the roller 51 engages the finger 58 of the arm 57 to move the latter clockwise about its pivot 43. This movement causes the pawl arm 32 to engage the ratchet 31 to move the latter, and the cam 27, one step in a clockwise direction. (See Figs. 18 and 19). One of the notches 28 is then in line with the finger 26 of the brake lever 20 so that the spring 24 causes the application of the brake upon the turn-table to stop the motion of the entire mechanism. The parts are then substantially in the position indicated in Fig. 14. The record may then be repeated by again manually setting the knob 29 as above described to repeat the above explained cycle. Or, a different record may be substituted and played, the knob 64 being adjusted to take care of any difference in size betwen the substituted record and the former one.

It may be stated that I have not only invented a machine for automatically accomplishing the above mentioned cycle of steps but have invented one in which a single record may be automatically repeated one or more times. If it is desired not only to play a record once but to repeat it, one or more times, the knob 29 is given a preliminary setting to space a notch 28 two steps, or three steps, or more (depending on whether or not it is desired to repeat once, twice or more times) in a counterclockwise direction from the finger 26 of the brake lever. Thus, suppose it is desired automatically to play and repeat a record once. The operation is exactly the same as that above explained in connection with playing a record once, except that the knob 29 is set to space a cam notch 28 two steps counterclockwise from the finger 26, instead of one as before. When the record has been played once the tone arm is automatically swung to the dotted line position (Fig. 14) as before and the pawl 32 actuates the ratchet and cam 27 one step. However the brake 23 is not applied at this time since the notch 28 is still one step from the finger 26. The cycle of operation is therefore automatically repeated and the mechanism comes to rest automatically after the first repetition in a manner now obvious.

Having disclosed a combination of instrumentalities for playing a single record or for automatically repeating the playing of such record I shall now proceed to disclose mechanism whereby a series or battery of records may be automatically played consecutively, attention being first directed to Figs. 1, 2, 3 and 9 to 13 inclusive.

A record-supporting rack or carrier adapted to receive a plurality of records, five in the present instance, is mounted upon the plate 22 and is preferably extensible to a position shown in Fig. 2 and collapsible to a position within the confines of the closed cover 11, as shown in Fig. 3. The rack illustrated comprises a hollow horizontal arm 130 secured to and supported by a hollow vertical standard 131. The latter is slidably mounted in a socket 132 secured to the plate 22 and a pin 133, mounted for radial sliding movement in said socket, is adapted to enter a hole 134 in the standard 131 in its elevated position. Obviously by withdrawing the pin from the hole 134 the rack may be lowered to the position shown in Fig. 3. Upon inspection of the drawings, particularly Figs. 2, 3, 9 and 14, and in view of the foregoing description it will be obvious that the entire record-supporting rack may be readily removed as a unit from the machine by simply withdrawing the pin 133 from the hole 134 and withdrawing the standard 131 from its socket 132. The record-supporting rack may also be reapplied as a unit to the machine by inserting the standard 131 into its socket. A plurality of record-supporting fingers are provided at each end of the arm 130. These are shown in the general form of bell crank levers, the group 135 to 139 being pivotally mounted at 140 on the arm 130 and the group 235 to 239 being pivotally mounted at 141 on the same arm. Each of the elements 135 to 139 is provided with a shoulder 142 adapted to seat against a shoulder 143 provided on a corresponding one of a series of links 335 to 339. Each of the group of levers 235 to 239 is pivotally connected at its upper end to a corresponding one of the links 335 to 339. These links are limited in their lateral movement by a suitably slotted bracket plate 144, secured to the arm 130, and normally rest upon a disc 145 as shown in Figs. 9 and 10. Each of the said links 335 to 339 is provided also with a finger 146 adapted to engage a corresponding one of the levers 135 to 139 below the pivot 140, when the parts are in the position shown in Fig. 9. The rack above described is designed to carry five records. Although such records are not illustrated in Fig. 9 the parts there shown are in the position occupied by them when supporting the records. It will be seen that the weight of a record borne by any pair of levers 135—235, or 136—236, etc., will be equally divided between the levers of that pair.

In order to aid in supporting the records and guide them in their movement onto the turn-table, as hereinafter described, the arm 130 is provided with a rod 147 adapted to enter the holes in the various records. This rod is shown provided with a recess 148 adapted to receive the upper end of the spindle 13 as shown in Fig. 2, and is preferably pivotally mounted so as to be capable of movement from that position to the position shown in Fig. 2. Thus the rod is pivoted at 149 on the arm 130, a spring 150 being provided for releasably holding it in either of its two positions. In Fig. 2, five records are shown mounted in the rack, the lower record being about to be released therefrom. Means are provided for automatically and successively releasing the records from the rack. One form of such means is illustrated in the drawings and may be constructed substantially as follows.

The disc 145 is secured to a shaft 151 journaled in the elbow joining the arm 130 and standard 131, and in the bottom of said standard. The hand wheel or knob 152 and the ratchet 153, secured at opposite ends of the shaft 151 prevent movement of said shaft in an axial direction. The disc 145 carries a pin 154 adapted to engage the links 335 to 339 and raise them one after another when the disc is rotated. The operation of the pin in actuating the links and levers to release the records will be understood by considering the action on the link 335 and levers 135 and 235. Assume that the pin 154 is in the position shown in Fig. 10 and that the disc 145 is rotated in a clockwise direction to move the pin under the link 335. The latter is raised to release the lever 135 from the shoulder 143 which permits the link to move toward the standard 131 and the levers 135 and 235 to drop by virtue of the weight of the record held thereby. (See Fig. 2.) The record thus released drops down upon the turn-table, being guided to correct position by the rod 147. Obviously, if the disc 145 is rotated further in a clockwise direction it will release successively the sets of levers 136—236, 137—237, 138—238 and 139—239 to permit the records supported thereby to drop successively. Means are provided for automatically operating the shaft 146 to cause a record to drop upon the turn-table after a record upon the latter has been played and after the tone arm has been moved to initial position. This means may be constructed substantially as follows.

The arm 57, which is pivoted at 43, has rigidly secured thereto an arm 160 which has a pawl 161 pivoted thereto at 162. The pawl 161 is biased in a clockwise direction with respect to the arm 160 by means of a spring 163 secured to said pawl and arm. The pawl is limited in such movement by a lug 164 provided on the arm 160 and adapted to be engaged by the pawl. The pawl and arm 160 are limited in their clockwise movement about the pivot 43 by engagement of the shoulder 165 with a stop 166. The rear end of the pawl 161 is provided with a V-notch 177 adapted to cooperate with a finger 178 provided on a member 179, the design being such that (the member 179 being in the position shown in Fig. 14) when the arm 160 is moved from its extreme left hand position to the extreme right hand position, the pawl 161 will engage and operate the ratchet 153 one step in a clockwise direction. Assuming that the levers 135 to 139 and 235 to 239 are all in released position and that it is desired automatically to play six records in succession, the operation is as follows.

The thumb nut or knob 152 is turned to place the disc 145 in the position shown in Fig. 10, suitable indicia being provided on said knob and the top of the arm 130 (see Fig. 1) to guide the operator in effecting this setting. If the six records to be played are ten inch records the knob 64 is set to the ten inch position and if the records are twelve inch ones the knob 64 is correspondingly set. The six records are placed upon the turn-table and the arm 147 is swung to the position shown in Fig. 2. A record is then slipped up the rod 147 and the fingers 139 and 239 lifted under it to hold it. The next record is then slipped up the rod 147 and the fingers 138—238 lifted thereunder and so on until five records are mounted and held in the rack. The sixth record remains upon the turn-table. The knob 29 is then turned to space one of the notches six steps in a counterclockwise direction from the finger 26 of the brake lever 20, i. e., in such position that the record drop arrow on disc 29 is at number 6. In order to aid the operator in effecting this setting as well as the setting of the knob 29 to effect a repeat, the said knob and a cooperating dial plate are provided with suitable indicia such as those illustrated in Fig. 1.

When the knob 29 has been adjusted to the "6" position, the brake 23 is thereby released and the spindle 13 and turn-table 12 begin to rotate. In accordance with the cycle set forth above in connection with the explanation of the playing of a single record, the tone arm 15 moves to the dotted line position, shown at 15' in Fig. 1, the sound box is lowered, the needle 17 engages the record upon the turn-table and is moved into the first groove of the record, and playing of the latter begins. When the playing of the record has been completed, and the needle 17 is in the last or inside groove, the sound box 16 is raised, the tone arm is moved counterclockwise to the full line position shown in Fig. 1, the cam 27 is rotated one step in a clockwise direction (by the operation of pawl 32 and ratchet 31), and the pawl 161 is moved to actuate the ratchet 153 one step in a clockwise direction. The last described operation causes the pin 154 to move under the link 335 to elevate the latter thereby releasing the levers 135 and 235, permitting the lowermost of the five rack-held records to drop down upon the turn-table on top of the record previously mounted upon the latter. The tone arm then moves into playing position and the above outlined cycle is repeated to play the top record on the turn-table. The operation in automatically and successively dropping and playing the remaining rack-held records will be understood in view of the foregoing explanation.

After the sixth record upon the turntable has been played and the tone arm 15 restored to its initial position (shown in full lines in Fig. 1), the cam 27 will have been moved six steps in a clockwise direction and the brake 23 will operate to stop the turn-table and other moving parts. The records may then be removed from the turn-table and the machine reloaded. If the propelling motor (not shown) of the machine is a spring motor, care should be taken to wind it sufficiently to play the number of records with which the machine is charged at the particular time.

If desirable the machine may be charged to play automatically a lesser number of records, the knob 29 being adjusted in any case to correspond to the number of records forming the charge or load. Provisions are preferably made to repeat any desired record of the series with which the machine may be charged. The mechanism by virtue of which this function is accomplished may be constructed as follows.

The member 179 is so mounted on pins 21 and 190 as to be capable of moving from the position illustrated in Fig. 14 to the position shown in Fig. 16 or vice versa. The design is such that when the slide 179 is in the position shown in Fig. 14 the pawl 161, in its forward movement, will engage the ratchet 153 to feed the pin 154 one step. But when the said slide 179 is in the position illustrated in Fig. 16 the finger 178 thereof will prevent the pawl 161 from engaging and operating the record-drop-controlling ratchet 153. In order to hold the slide 179 in either of the two above mentioned positions and to facilitate setting to either of these positions, a cam 191 is secured to the shaft 30 to which the knob 29 is secured. The cam 191 is a two-radius one, substantially one semicircle of the cam having a different radius than that of the remaining portion. The design and location of the cam are such that when the knob 29 is set to any one of its six positions (i. e., the arrow "Record drop" set to any of positions 1 to 6) for automatically and successively playing a series of from one to six records, the smaller radius semicircular part of the said cam 191 will lie adjacent the end of the slide 179 with which said arm cooperates. In short the cam 191 does not interfere with the automatic successive playing of a series of records as hereinbefore described. However, if the knob 29 is adjusted, before the needle 17 has reached the last groove of a particular record being played, so as to bring the high part of the cam into contact with the slide 179, the latter will prevent the next record from being dropped and the record upon the turn-table will be repeated. After the repetition of the particular record has been completed the knob 29 is reset to a position depending upon the number of records remaining in the rack.

If desirable the knob 29, and dial therefor, may be so calibrated with respect to the location of the cam 191 that when the index marked "Repeat" is placed in registry with any one of the numerals 1 to 6 on the dial before the cycle is started, the corresponding one of the six records, with which the machine is charged, will automatically repeat after its first playing has been completed. After such repetition the knob 29 would then be reset in accordance with the number of records of the series yet to be played. As mentioned above, if it is desired to play all of the records, with which the machine has been loaded, successively and without any repetition, the index labeled "Record drop" is placed in registry with the one of the numerals 1 to 6 which corresponds to the number of records constituting the charge.

In accordance with the provisions of the patent statutes, I have herein described the principle of operation of my invention, together with what I now consider to represent the best embodiment thereof but I desire to have it understood that the apparatus shown is only illustrative and that the invention can be carried out by other means. Also, while it is designed to use the various features and elements in the combinations described, some of these may be altered and others omitted without interfering with the more general results and effects outlined, and the invention extends to such use.

What I claim is:

In a multiple-record phonograph the combination with a turntable, a reproducer arm, a reproducer, a stack of records adapted to be successively fed to the turntable and a brake for the turntable, of means for automatically moving the reproducer arm to record-playing position and means called into action by cessation of movement of said reproducer arm across said turn-table sequentially to raise the reproducer from a record when it has completed reproducing a selection thereon, to move the reproducer arm clear of the record, to supply another record from said stack to said turntable and to lower the reproducer onto the newly supplied record, means to render the brake operative to stop the turntable and means for predetermining the number of records from the stack to be played in succession before the brake becomes operative to stop the machine.

In testimony whereof I hereto affix my signature.

SAMUEL KOHN.